United States Patent
Chang et al.

(10) Patent No.: US 9,038,434 B2
(45) Date of Patent: May 26, 2015

(54) COMPUTING DEVICE AND METHOD FOR CALIBRATING STAR PROBE OF IMAGE MEASURING MACHINE

(75) Inventors: Chih-Kuang Chang, New Taipei (TW); Zheng-Cai She, Shenzhen (CN); Zhong-Kui Yuan, Shenzhen (CN); Zhi-Jun Zou, Shenzhen (CN); Dong-Hai Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 408 days.

(21) Appl. No.: 13/555,203

(22) Filed: Jul. 23, 2012

(65) Prior Publication Data

US 2013/0120562 A1    May 16, 2013

(30) Foreign Application Priority Data

Nov. 10, 2011    (CN) .......................... 2011 1 0354456

(51) Int. Cl.
*G01B 11/00*        (2006.01)
*G01B 11/03*        (2006.01)

(52) U.S. Cl.
CPC ............... *G01B 11/00* (2013.01); *G01B 11/03* (2013.01)

(58) Field of Classification Search
CPC ......... G01B 11/00; G01B 11/03; G01B 11/14
USPC .............. 33/502, 559–560; 73/1.79; 348/135, 348/E7.085; 356/243.1, 614–615, 624–625, 356/630, 634–635, 908; 702/95, 97
See application file for complete search history.

(56) References Cited

U.S. PATENT DOCUMENTS

| | | | | |
|---|---|---|---|---|
| 3,216,120 A * | 11/1965 | Sweigart et al. | ................ | 33/502 |
| 4,523,450 A * | 6/1985 | Herzog | ........................ | 33/502 X |
| 5,953,687 A * | 9/1999 | Zink et al. | ................... | 702/95 X |
| 6,546,643 B2 * | 4/2003 | Lotze et al. | ..................... | 33/559 |
| 8,433,515 B2 * | 4/2013 | You et al. | ...................... | 701/513 |
| 8,855,407 B2 * | 10/2014 | Chang et al. | .................. | 382/154 |
| 2005/0005465 A1 * | 1/2005 | Taylor et al. | .................... | 33/502 |
| 2013/0278751 A1 * | 10/2013 | Kranitzky et al. | ............. | 348/94 |
| 2014/0257733 A1 * | 9/2014 | Chang et al. | .................... | 702/95 |

FOREIGN PATENT DOCUMENTS

| | | | | |
|---|---|---|---|---|
| CN | 101858755 A | * | 10/2010 | ............. G01C 25/00 |
| CN | 102032918 A | * | 4/2011 | ............. G01C 25/00 |
| CN | 102538825 A | * | 7/2012 | ............. G01C 25/00 |
| WO | WO 2012095199 A1 | * | 7/2012 | ................ G06T 7/00 |

* cited by examiner

*Primary Examiner* — Thomas P Noland
(74) *Attorney, Agent, or Firm* — Novak Druce Connolly Bove + Quigg LLP

(57) ABSTRACT

In a method for calibrating a star probe of an image measuring machine, the star probe includes one or more probe heads. Probe configuration information for the star probe is configured when there is no probe configuration file of the star probe stored in a storage device of the image measuring machine, and one of the probe heads to be calibrated is selected from the star probe. The method calibrates a radius value of the selected probe head, and calibrates the deviation between the center point of the selected probe head and the focus of the camera lens. The method further generates a star probe model of the star probe according to the probe configuration information and the probe calibration information, and displays the star probe model of the star probe on a display device of the image measuring machine.

18 Claims, 5 Drawing Sheets

COMPUTING DEVICE AND METHOD FOR CALIBRATING STAR PROBE OF IMAGE MEASURING MACHINE

BACKGROUND

1. Technical Field

Embodiments of the present disclosure relate to probe measurement systems and methods, and particularly to a computing device, a storage medium, and a method for calibrating a star probe of an image measuring machine.

2. Description of Related Art

Coordinate measurement machines, such as image measuring machines, can be used to perform a variety of measurement and coordinate acquisition tasks. In an image measuring machine, a movable arm having one or more transfer members can be connected to a star probe for measuring various dimensions of workpieces. To obtain optimal precision and accuracy of the measurements, the star probe must initially be calibrated before it can be used in the image measuring machine. However, the star probe calibration process may result in acceptable calibration results as the precision length of the movable arm is difficult and costly to produce, and is also time consuming as the image measuring machine would need to be manually manipulated between various measuring positions of the workpiece with respect to the star probe.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of a non-transitory computer-readable medium include CDs, DVDs, flash memory, and hard disk drives.

Figure 1:
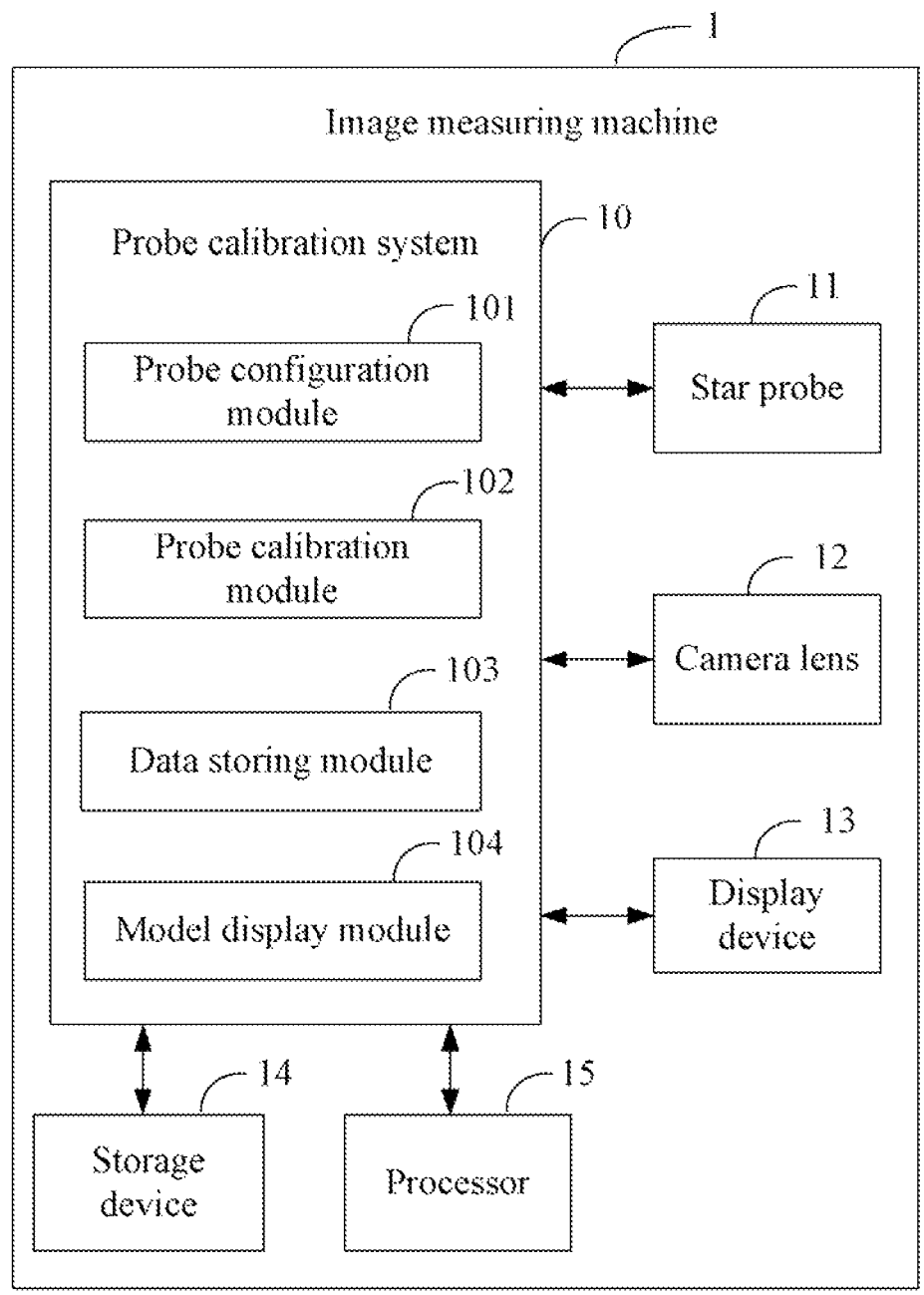
FIG. 1 is a block diagram of one embodiment of an image measuring machine including a probe calibration system.

FIG. 1 is a block diagram of one embodiment of an image measuring machine 1 including a probe calibration system 10. In the embodiment, the computing device 1 further includes a star probe 11, a camera lens 12, a display device 13, a storage device 14, and at least one processor 15. The probe calibration system 10 may include a plurality of functional modules that are stored in the storage device 14 and executed by the at least one processor 15. FIG. 1 is only one example of the image measuring machine 1, other examples may include more or fewer components than those shown in the embodiment, or have a different configuration of the various components.

Figure 2:
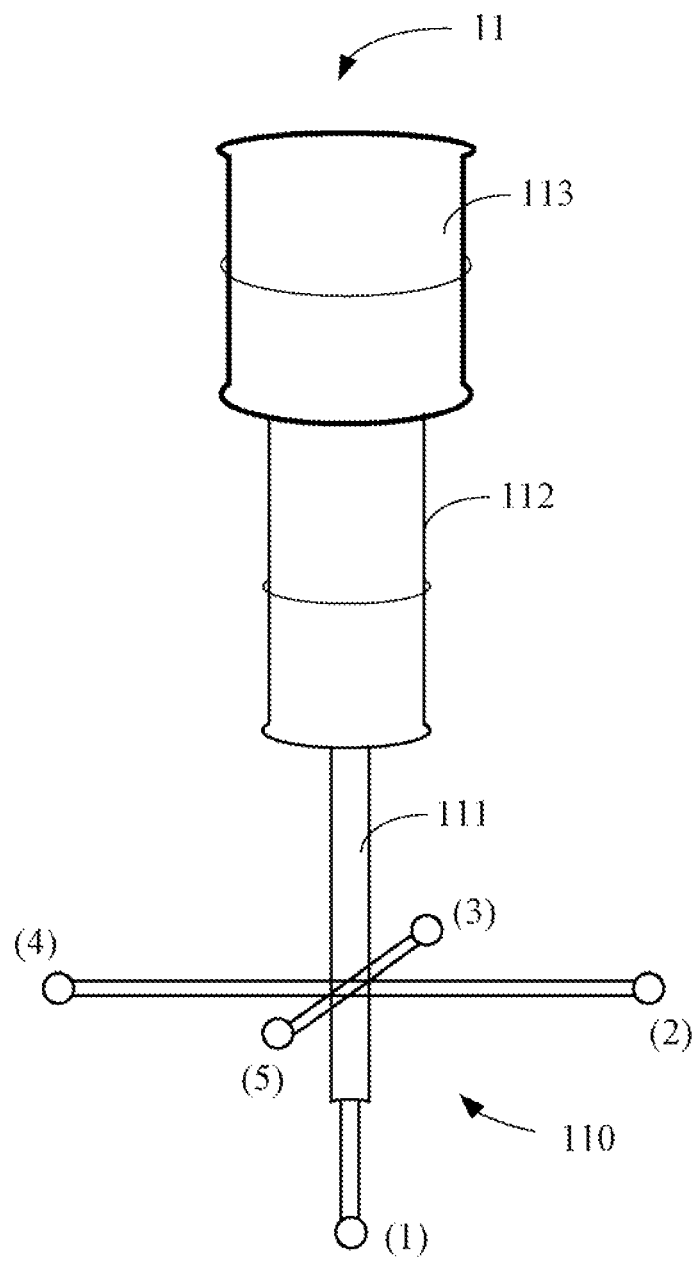
FIG. 2 is a schematic diagram illustrating a star probe included in the image measuring machine of FIG. 1.

FIG. 2 is a schematic diagram illustrating the star probe 11 included in the image measuring machine 1. In one embodiment, the star probe 11 includes a plurality of probe heads 110, a probe pole 111, a distance sensor 112, and a sensor pole 113. The star probe 11 is equipped with five of the probe heads 110, such as the number (1) from the number (5) as shown in FIG. 2. Each of the probe heads 110 contacts with a workpiece to be measured (e.g., makes contact with the workpiece) for various measurements of the workpiece. The probe pole 111 is an extendable pole that controls each of the probe heads 110 to contact with measuring points of the workpiece for the measurements of the workpiece. The distance sensor 112 senses data from each of the measuring points (hereinafter "measuring data") when one of the probe heads 110 contacts with the measuring point, and sends the measuring data to the probe calibration system 10. The sensor pole 113 is an extendable pole that adjusts a distance between the distance sensor 112 and each of the measuring points. The measuring data includes the measurements of the workpiece.

The camera lens 12 captures an image of the workpiece, and sends the captured image to the probe calibration system 10 to obtain image measuring results of the workpiece. The display device 13 displays the image measuring results of the workpiece and a star probe model of the star probe 11. In one embodiment, the star probe model is a three-dimensional (3D) image of the star probe 11, and can be displayed on the display device 13.

The storage device 14 stores a probe configuration file of the star probe 11 containing probe configuration information of the star probe 11. The probe configuration information includes a type of each of the probe heads 110, and a length of the probe pole 111, a distance of the distance sensor 112, and a length of the sensor pole 113. In one embodiment, the storage device 14 may be an internal storage device, such as a random access memory (RAM) for temporary storage of information, and/or a read only memory (ROM) for permanent storage of information. In some embodiments, the storage device 14 may also be an external storage device, such as an external hard disk, a storage card, or a data storage medium.

In one embodiment, the probe calibration system 10 includes a probe configuration module 101, a probe calibration module 102, a data storing module 103, and a model display module 104. The modules 101-104 may comprise computerized instructions in the form of one or more programs that are stored in the storage device 14 and executed by the at least one processor 15. A detailed descriptions of each module will be given in FIG. 3 as described in the following paragraphs.

Figure 3:
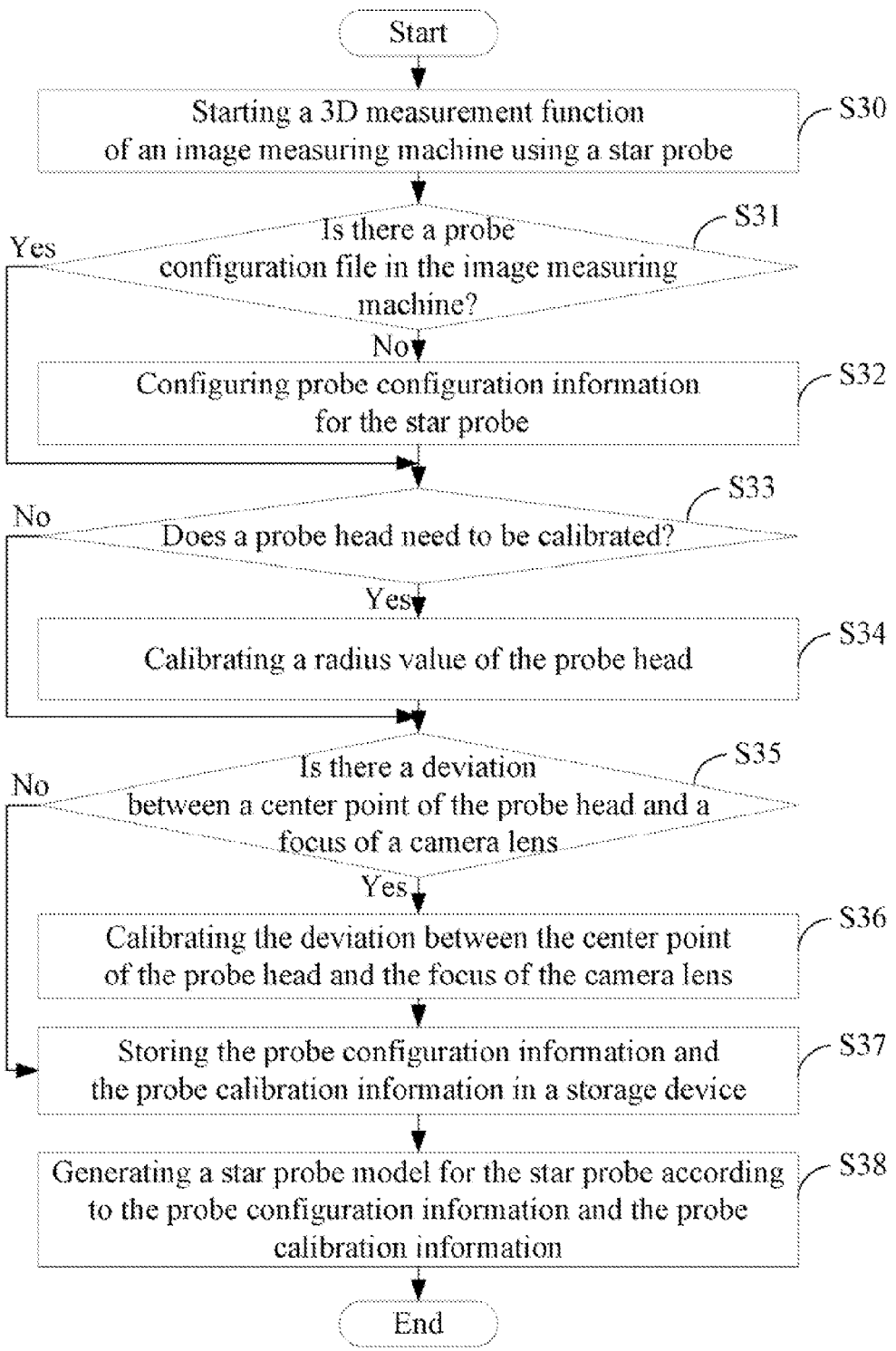
FIG. 3 is a flowchart of one embodiment of a method for calibrating a star probe of the image measuring machine of FIG. 1.

FIG. 3 is a flowchart of one embodiment of a method for calibrating a star probe of the image measuring machine 1 of FIG. 1. In the embodiment, the method can configure probe configuration information for the star probe 11 and automatically calibrate the star probe 11 using the probe configuration information. Depending on the embodiment, additional steps may be added, others removed, and the ordering of the steps may be changed.

In step S30, a three-dimensional (3D) measurement function of the image measuring machine 1 is started using the star probe 11. In one example, a user can start the 3D measurement function through a probe operation interface of the image measuring machine 1, and uses the star probe 11 to perform 3D measurements of a workpiece to be measured.

In step S31, the probe configuration module 101 determines whether there is a probe configuration file of the star probe 11 stored in the storage device 14 of the image measuring machine 1. If there is a probe configuration file of the star probe 11 stored in the storage device 14, step S33 is implemented. Otherwise, if there is no probe configuration file of the star probe 11 stored in the storage device 14, step S32 is implemented.

In step S32, the probe configuration module 101 configures probe configuration information for the star probe 11. For example, the probe configuration module 101 configures a number of each of the probe heads 110 as "PH1-PH5," sets the length of the probe pole 111 as a default value, configures the type of the distance sensor 112 as "TP20," sets the length of the sensor pole 113 as "5WAY", and configures the type of the probe head 110 used in the image measuring machine 1 as "BALL2BY20."

In step S33, the probe calibration module 102 determines whether each of the probe heads 110 needs to be calibrated according to the probe configuration information of the star probe 11. If any of the probe heads 110 needs to be calibrated, step S34 is implemented. Otherwise, if none of the probe heads 110 needs to be calibrated, step S35 is implemented.

In step S34, the probe calibration module 102 selects one of the probe heads 110 to be calibrated from the star probe 11, and calibrates a radius value of the selected probe head 110. In one embodiment, the probe calibration module 102 calibrates the probe heads 110 according to the sequence number, such as the number (1) from the number (5) as shown in FIG. 2. The detailed description of step S34 is described in FIG. 4.

In step S35, the probe calibration module 102 determines whether there is a deviation between a center point of the selected probe head 110 and a focus of the camera lens 12. In one embodiment, the image measuring machine 1 obtains the measurement data of the workpiece using the probe head 110, and obtains the image data of the workpiece using the camera lens 12. The probe calibration module 102 compares the measurement data with the image data to determine whether there is a deviation between a center point of the selected probe head 110 and a focus of the camera lens 12. If there is a deviation between the center point of the selected probe head 110 and the focus of the camera lens 12, block S36 is implemented. Otherwise, if there is no deviation between the center point of the selected probe head 110 and the focus of the camera lens 12, block S37 is implemented.

In step S36, the probe calibration module 102 calibrates the deviation between the center point of the probe head and the focus of the camera lens 12, and generates the probe calibration information according to the calibrated radius value and the selected deviation. The detailed description of step S36 is described in FIG. 5.

In step S37, the data storing module 103 stores the probe configuration information and the probe calibration information in the storage device 14. In one embodiment, the data storing module 103 can also encrypt the probe configuration information and the probe calibration information as an encrypted probe configuration file, to improve the security of the probe configuration information and the probe calibration information of the start probe 11.

In step S38, the model display module 104 generates a star probe model for the star probe 11 according to the probe configuration information and the probe calibration information, and displays the star probe model on the display device 13. The star probe model is a three-dimensional (3D) image of the star probe 11, and can be displayed on the display device 13. As such, the user can operate the star probe model displayed on the display device 13, so as to control a direction of the star probe 11 to measure the workpiece.

Figure 4:
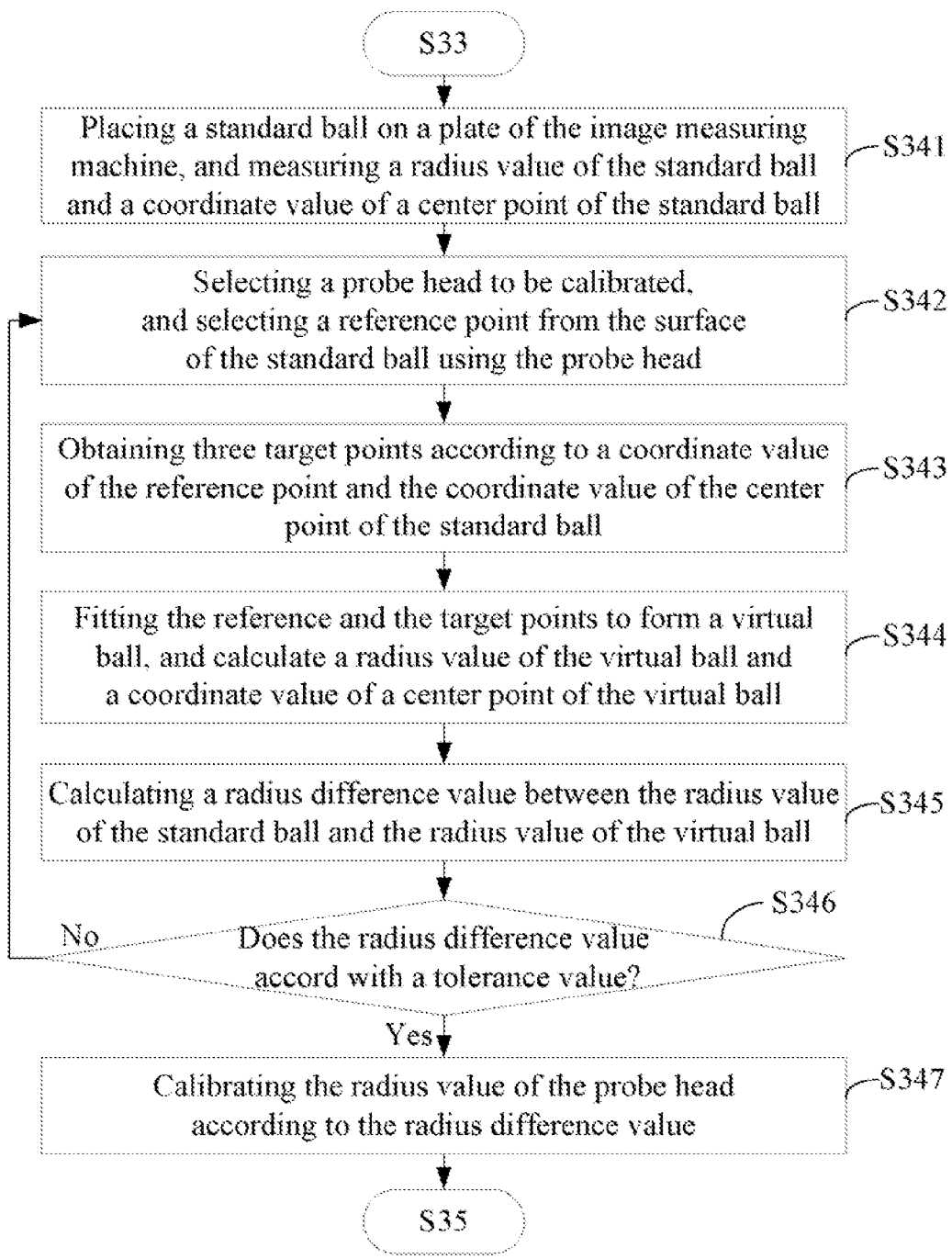
FIG. 4 is a detailed flowchart of step S34 in FIG. 3.

FIG. 4 is a detailed flowchart of step S34 in FIG. 3. In step S341, a radius value of a standard ball and a coordinate value of a center point of the standard bal is measured. The standard ball may be placed on a plate of the image measuring machine 1. In step S342, one of the probe heads 110 is selected to be calibrated from the star probe 11, and a reference point from the surface of the standard ball is selected using the selected probe head 110. In one embodiment, if the number (1) probe head 110 is selected, the reference point is selected from the top surface of the standard ball. If the number (2) probe head 110 is selected, the reference point is selected from the left surface of the standard ball.

In step S343, the probe calibration module 102 obtains three target points according to a coordinate value of the reference point and the coordinate value of the center point of the standard ball, where the target points are not in a plane of the standard ball. In step S344, the probe calibration module 102 fits the reference point and the target points to form a virtual ball, and calculates a radius value of the virtual ball and a coordinate value of a center point of the virtual ball. In step S345, the probe calibration module 102 calculates a radius difference value between the radius value of the standard ball and the radius value of the virtual ball.

In step S346, the probe calibration module 102 determines whether the radius difference value accords with a preset tolerance value. In one embodiment, the tolerance value can be preset according to the precision requirements, such as 0.01 mm. If the radius difference value accords with the tolerance value, the process returns to step S342. If the radius difference value does not accord with the tolerance value, the probe calibration module 102 calibrates the radius value of the probe head according to the radius difference value.

Figure 5:
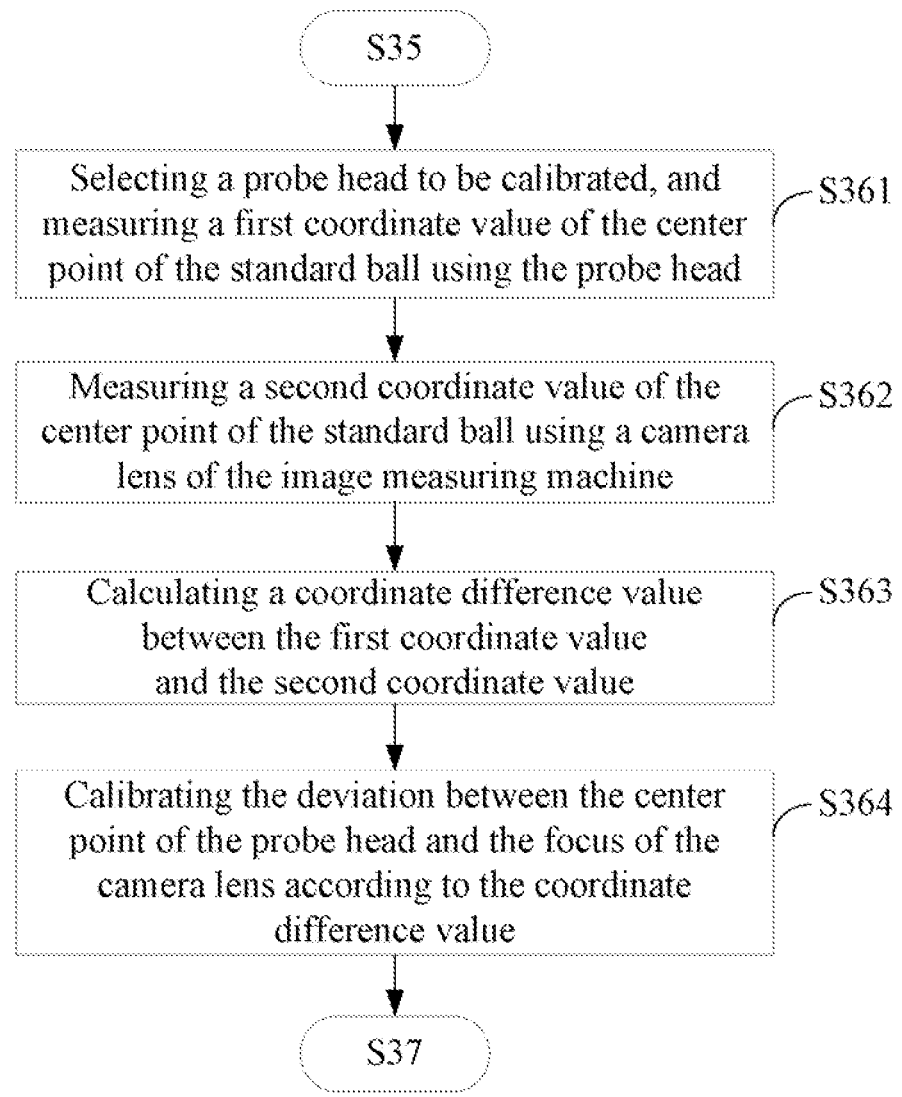
FIG. 5 is a detailed flowchart of step S36 in FIG. 3.

FIG. 5 is a detailed flowchart of step S36 in FIG. 3. In step S361, one of the probe heads 110 to be calibrated is selected from the star probe 11, and measures a first coordinate value of the center point of the standard ball is measured using the selected probe head 110. In step S362, the probe calibration module 102 measures a second coordinate value of the center point of the standard ball using the camera lens 12.

In step S363, the probe calibration module 102 calculates a coordinate difference value between the first coordinate value and the second coordinate value. In step S363, the probe calibration module 102 calibrates the deviation between the center point of the probe head 110 and the focus of the camera lens 12 according to the coordinate difference value.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An image measuring machine, comprising:
a star probe comprising a plurality of probe heads;
a camera lens and a storage device;
at least one processor; and
a probe calibration system stored in the storage device and executed by the at least one processor, the probe calibration system comprising:
a probe configuration module that configures probe configuration information for the star probe using a probe configuration file stored in the storage device;
a probe calibration module that determines whether each of the probe heads needs to be calibrated according to the probe configuration information of the star probe, selects one of the probe heads to be calibrated from the star probe and calibrates a radius value of the selected probe head, determines whether there is a deviation between a center point of the selected probe head and a focus of the camera lens, calibrates the deviation between the center point of the selected probe head and the focus of the camera lens, and generates probe calibration information according to the calibrated radius value and the selected deviation; and a model display module that generates a star probe model for the star probe according to the probe configuration information and the probe calibration information, and displays the star probe model on a display device of the image measuring machine.

2. The image measuring machine according to claim 1, wherein the star probe further comprises a probe pole, a distance sensor, and a sensor pole.

3. The image measuring machine according to claim 2, wherein the probe configuration file contains probe configuration information of the star probe that comprises a type of each of the probe heads, and a length of the probe pole, a sensing distance of the distance sensor, and a length of the sensor pole.

4. The image measuring machine according to claim 1, wherein the probe calibration system further comprises a data storing module that stores the probe configuration information and the probe calibration information in the storage device, and encrypts the probe configuration information and the probe calibration information to the probe configuration file.

5. The image measuring machine according to claim 1, wherein the probe calibration module calibrates a radius value of the selected probe head by performing steps of:
measuring a radius value of a standard ball placed on a plate of the image measuring machine, and measuring a coordinate value of a center point of the standard ball;
selecting a reference point from the surface of the standard ball using the selected probe head;
obtaining three target points according to a coordinate value of the reference point and the coordinate value of the center point of the standard ball, where the target points are not in a plane of the standard ball;
fitting the reference point and the target points to form a virtual ball, and calculating a radius value of the virtual ball and a coordinate value of a center point of the virtual ball;
calculating a radius difference value between the radius value of the standard ball and the radius value of the virtual ball; and
calibrating the radius value of the selected probe head according to the radius difference value when the radius difference value accords with a preset tolerance value.

6. The image measuring machine according to claim 1, wherein the probe calibration module calibrates the deviation between the center point of the selected probe head and the focus of the camera lens by performing steps of:
measuring a first coordinate value of a center point of a standard ball placed on a plate of the image measuring machine using the selected probe head;
measuring a second coordinate value of the center point of the standard ball using the camera lens;
calculating a coordinate difference value between the first coordinate value and the second coordinate value; and
calibrating the deviation between the center point of the probe head and the focus of the camera lens according to the coordinate difference value.

7. A method for calibrating a star probe of an image measuring machine, the star probe comprising a plurality of probe heads, the method comprising:
configuring probe configuration information for the star probe according to a probe configuration file stored in a storage device of the image measuring machine;
determining whether each of the probe heads needs to be calibrated according to the probe configuration information of the star probe;
selecting one of the probe heads to be calibrated from the star probe, and calibrating a radius value of the selected probe head;
determining whether there is a deviation between a center point of the selected probe head and a focus of a camera lens of the image measuring machine;
calibrating the deviation between the center point of the selected probe head and the focus of the camera lens, and generating probe calibration information according to the calibrated radius value and the selected deviation; and
generating a star probe model for the star probe according to the probe configuration information and the probe calibration information, and displaying the star probe model on a display device of the image measuring machine.

8. The method according to claim 7, wherein the star probe further comprises a probe pole, a distance sensor, and a sensor pole.

9. The method according to claim 8, wherein the probe configuration file comprises a type of each of the probe heads, and a length of the probe pole, a sensing distance of the distance sensor, and a length of the sensor pole.

10. The method according to claim 7, further comprising:
storing the probe configuration information and the probe calibration information in the storage device; and
encrypting the probe configuration information and the probe calibration information to the probe configuration file.

11. The method according to claim 7, wherein the radius value of the selected probe head is calibrated by performing steps of:
measuring a radius value of a standard ball placed on a plate of the image measuring machine, and measuring a coordinate value of a center point of the standard ball;
selecting a reference point from the surface of the standard ball using the selected probe head;
obtaining three target points according to a coordinate value of the reference point and the coordinate value of the center point of the standard ball, where the target points are not in a plane of the standard ball;
fitting the reference point and the target points to form a virtual ball, and calculating a radius value of the virtual ball and a coordinate value of a center point of the virtual ball;
calculating a radius difference value between the radius value of the standard ball and the radius value of the virtual ball; and
calibrating the radius value of the selected probe head according to the radius difference value when the radius difference value accords with a preset tolerance value.

12. The method according to claim 7, wherein the deviation between the center point of the selected probe head and the focus of the camera lens is calibrated by performing steps of:
measuring a first coordinate value of a center point of a standard ball placed on a plate of the image measuring machine using the selected probe head;

measuring a second coordinate value of the center point of the standard ball using the camera lens;

calculating a coordinate difference value between the first coordinate value and the second coordinate value; and calibrating the deviation between the center point of the probe head and the focus of the camera lens according to the coordinate difference value.

13. A non-transitory computer-readable storage medium having stored thereon instructions that, when executed by at least one processor of an image measuring machine, causes the processor to perform a method for calibrating a star probe of the image measuring machine, the star probe comprising a plurality of probe heads, the method comprising:

configuring probe configuration information for the star probe according to a probe configuration file stored in a storage device of the image measuring machine;

determining whether each of the probe heads needs to be calibrated according to the probe configuration information of the star probe;

selecting one of the probe heads to be calibrated from the star probe, and calibrating a radius value of the selected probe head;

determining whether there is a deviation between a center point of the selected probe head and a focus of a camera lens of the image measuring machine;

calibrating the deviation between the center point of the selected probe head and the focus of the camera lens, and generating probe calibration information according to the calibrated radius value and the selected deviation; and generating a star probe model for the star probe according to the probe configuration information and the probe calibration information, and displaying the star probe model on a display device of the image measuring machine.

14. The storage medium according to claim 13, wherein the star probe further comprises a probe pole, a distance sensor, and a sensor pole.

15. The storage medium according to claim 14, wherein the probe configuration file contains probe configuration information of the star probe that comprises a type of each of the probe heads, and a length of the probe pole, a sensing distance of the distance sensor, and a length of the sensor pole.

16. The storage medium according to claim 13, wherein the method further comprises:

storing the probe configuration information and the probe calibration information in the storage device; and encrypting the probe configuration information and the probe calibration information to the probe configuration file.

17. The storage medium according to claim 13, wherein the radius value of the selected probe head is calibrated by performing steps of:

measuring a radius value of a standard ball placed on a plate of the image measuring machine, and measuring a coordinate value of a center point of the standard ball;

selecting a reference point from the surface of the standard ball using the selected probe head;

obtaining three target points according to a coordinate value of the reference point and the coordinate value of the center point of the standard ball, where the target points are not in a plane of the standard ball;

fitting the reference point and the target points to form a virtual ball, and calculating a radius value of the virtual ball and a coordinate value of a center point of the virtual ball;

calculating a radius difference value between the radius value of the standard ball and the radius value of the virtual ball; and calibrating the radius value of the selected probe head according to the radius difference value when the radius difference value accords with a preset tolerance value.

18. The storage medium according to claim 13, wherein the deviation between the center point of the selected probe head and the focus of the camera lens is calibrated by performing steps of:

measuring a first coordinate value of a center point of a standard ball placed on a plate of the image measuring machine using the selected probe head;

measuring a second coordinate value of the center point of the standard ball using the camera lens;

calculating a coordinate difference value between the first coordinate value and the second coordinate value; and calibrating the deviation between the center point of the probe head and the focus of the camera lens according to the coordinate difference value.

* * * * *